May 10, 1955 W. E. CAMERON ET AL 2,707,878
TROLLING SPEED INDICATOR
Filed July 27, 1953
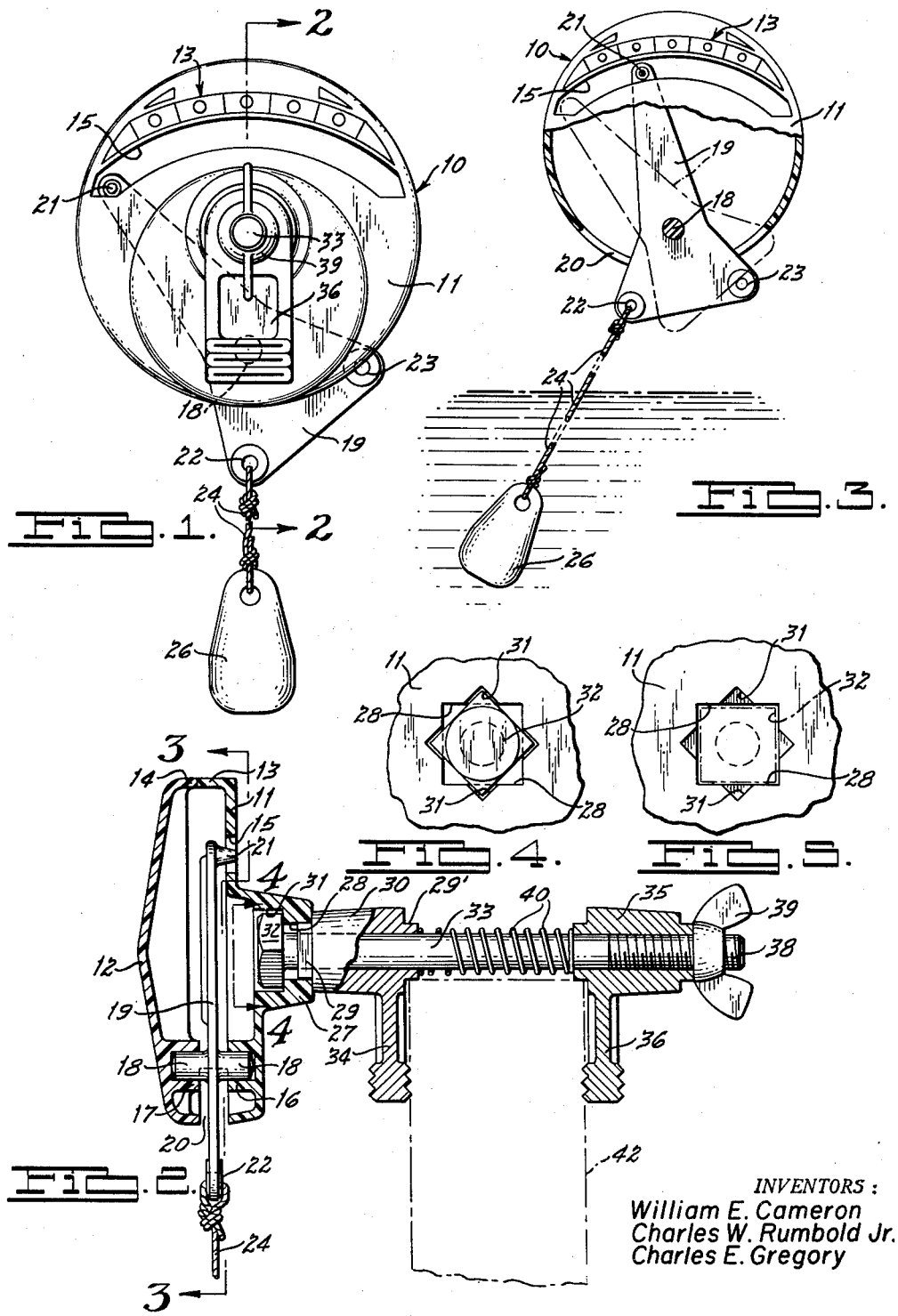
INVENTORS:
William E. Cameron
Charles W. Rumbold Jr.
Charles E. Gregory

United States Patent Office 2,707,878
Patented May 10, 1955

2,707,878

TROLLING SPEED INDICATOR

William E. Cameron, Charles W. Rumbold, Jr., and Charles E. Gregory, Detroit, Mich.

Application July 27, 1953, Serial No. 370,581

5 Claims. (Cl. 73—184)

This invention relates to an improved fluid flow velocity measuring device. More particularly, the present invention relates to a speed indicator for measuring the rate of travel of a marine craft through the water or for measuring the flow velocity of the current in rivers, streams, canals or any other natural or artificial flowing body of fluid.

The present invention is particularly suitable for measuring the trolling speed of a fishing boat and is adapted to be conveniently carried with the usual fishing gear.

During the trolling operation it is important to establish an optimum trolling speed for the particular type of lure which is being used and for the particular weight of the sinker which is chosen in order to establish the most effective depth. It is equally as important to maintain that optimum trolling speed without substantial variation in order to maintain a uniform depth for the lure.

Accordingly, it is a principal object of the present invention to provide a means for measuring the rate of travel through the water of a fishing craft during a trolling operation.

A further object of the present invention is to provide a means for measuring the trolling speed of a fishing craft which has a high degree of accuracy in both calm and windy weather and which is not affected by surface disturbances in the water.

A further object of the present invention is to provide a means for measuring the trolling speed of a fishing craft which is durable, compact, easily carried, and adapted to be manufactured at a relatively low manufacturing cost.

A further object of the present invention is to provide a trolling speed indicator for fishing craft which includes a clamping portion that is readily adapted to be clamped to objects of widely varying thickness and which may be readily assembled to and disassembled from the main body portion of the device with one simple manual operation.

A further object of the present invention is to provide a means for measuring the relative rate of flow of a body of fluid with respect to a stationary object or with respect to an object which is moving with respect to a fixed point at a velocity which is different in direction or magnitude, or both, than the velocity of flow of the body of fluid with respect to that same fixed point.

Other objects will readily become apparent from the following specification, the drawings, and the appended claims.

In general, the present invention comprises a lever which is pivoted at a point substantially intermediate the two ends thereof to a suitable housing. A flexible line, having a suitable weight on one end thereof, is attached to one end of the lever. The weighted line is adapted to extend into the water at a predetermined depth below the surface.

The other end of the lever is provided with an indicator pointer which is adapted to move in an arc about the pivot point of the lever.

The housing is provided with an arcuate slot and a series of gradations adjacent thereto. The pointer on one end of the lever is adapted to move within the slot to any one of a plurality of arcuate positions as indicated by the gradations on the housing when the device is moved relative to the water.

A novel clamping means is provided for clamping the indicator housing to the side of a boat while the weighted line is immersed in the water.

The fluid drag or resistance to relative motion between the body of fluid and a submerged solid object, such as the weight suspended from the subject indicator, is proportional to the square of the relative velocity of motion. Accordingly, the angle formed by the weighted line will vary with respect to the plane of the water surface as the trolling speed changes in magnitude due to the resistance offered by the fluid to this relative motion. Since the lever in the indicator housing is pivoted near its center portion, the pointer on the end of the lever will be caused to move in the arcuate slot in the housing as the angle of the weighted line is varied. The position assumed by the pointer depends upon the magnitude of the fluid drag exerted by the water on the weight which in turn is dependent upon the relative velocity between the indicator and the water.

For a more specific description of one preferred embodiment of the present invention, reference will be made to the accompanying drawings wherein:

Figure 1 is a plan view of the indicator housing showing the pivoted indicator lever therein, the weighted line and the end of the holding clamp;

Figure 2 is a sectional view taken along the section line 2—2 in Figure 1;

Figure 3 is a sectional view taken along the section line 3—3 in Figure 2;

Figure 4 is a view taken along the section line 4—4 of Figure 3 showing a clamping bolt for clamping the indicator to the side of a boat; and Figure 5 is a view similar to that shown in Figure 4 with the clamping bolt removed.

The indicator is generally designated in Figure 1 by numeral 10 and it includes a circular housing portion 11 which has an arcuate slot 15 formed therein. A series of markings, generally designated by numeral 13, are arcuately spaced along one side of the slot 15.

As best seen in Figure 2, the housing portion 11 is joined in any suitable manner to a second housing portion 12 in juxtaposed relationship therewith. Both housing portions 11 and 12 are formed with abutting peripheral edges, 13 and 14 respectively, which are effective to position the associated housing portions in axially spaced relationship with respect to each other thus defining an interior cavity within the indicator 10.

The housing portions 11 and 12 have formed therewith the support members 16 and 17, respectively, within the interior cavity of the indicator on the vertical centerline of the device and at a point considerably below the central axis thereof. A pair of circular openings are formed in the support members 16 and 17, one being formed in each member, which are coaxial with respect to each other and which are adapted to loosely receive separate ends of a circular hub member 18.

A lever 19 is integrally formed with the hub member 18 and is provided with an arm extending radially upward which carries thereon a speed indicator pointer 21. The slot 15 in the housing portion 11 is adapted to receive the pointer 21 so that it may be clearly visible when the indicator is viewed from one axial end.

The lever 19 is also provided with a depending portion of considerably greater width than the upwardly extending arm and has formed therein two eyelets 22 and 23 spaced at the extreme end of the depending portion on either side of the centerline of the lever 19 and equidistant therefrom. A suitable peripheral slot 20 is provided in the indicator housing through which the depending portion of lever 19 extends. A flexible line 24, having one end thereof tied to a suitable weight 26, is secured to either one of the eyelets, as at 22.

When the weight 26 is freely hanging in a perpendicular direction with respect to the plane of the water surface, the pointer 21 on the end of the radially extending arm of lever 19 is in the extreme left hand position as viewed from the side of housing portion 11 as in Figure 1 of the drawings. When the weighted line 24 is secured to the eyelet 23, the lever 19 pivots about the axis of hub 18 until the pointer 21 assumes the right hand position as viewed in Figure 1.

The housing portion 11 has integrally formed therewith an axially extending portion, shown at 27 in Figure 2, which is provided with a square shaped central opening 28 through which the square head 32 of a clamping bolt 33 is received. As best seen in Figures 4 and 5, the four corner portions of the bolt head 32 are seated against mating shoulders formed at the end of a square countersunk opening 31 in the portion 27. The opening 28 and the countersunk opening 31 are of equal size but are formed so that their transverse geometric axes are displaced 45° with respect to each other.

An end portion 29 of a clamp member 30 is formed with reduced dimensions and is adapted to be seated within the opening 28 thereby preventing relative rotation between the indicator housing and the clamp member.

The clamp member 30 is centrally bored to slidably receive the bolt 33 therethrough and is provided with a depending toothed jaw member 34 formed integrally therewith.

A mating clamp member, shown at 35 in Figure 2, is centrally bored to slidably receive another portion of bolt 33 and is axially spaced thereon with respect to the clamp member 30. A second toothed jaw member, shown at 36, is integrally formed on the member 35 and is axially spaced from the first jaw member 34.

The bolt 33 is threaded at one end thereof at 38 and receives thereon a wing nut 39 which is adapted to be manually turned on the bolt 33 to axially adjust the clamp member 35. A spring 40 is interposed between the clamp members 30 and 35 about the bolt 33 and it is effective to bias the jaw members 34 and 36 apart to facilitate the clamping operation.

The indicator device may be conveniently secured to the side rail of a fishing boat, which is designated generally by means of numeral 42, or to any other appropriate object merely by interposing the object to be clamped between the jaw members 34 and 36 and by manually adjusting the wing nut 39 to apply a clamping force. The wing nut 39 also is effective to exert an axial force on the portion 27 of the indicator housing and to clamp the same securely between the bolt head 32 and an annular shoulder on member 30.

In the operation of the indicator device, the assembly is clamped to an appropriate object as previously described so that the weighted line is immersed in the water approximately ten inches below the surface. When relative motion occurs between the indicator and the flowing body of water, the weight 26 on the end of the line will become displaced from the vertical position by virtue of the hydrodynamic forces exerted on the weight. As best seen in Figure 3, the displacement of the weighted line from a vertical position is accompanied by a pivoting motion of the lever 19 about the centerline of the hub 18 which in turn causes the pointer 21 to assume a position along the arcuate slot 15 intermediate the two extreme end positions.

The forces upon the weight 26 due to its own mass and due to the hydrodynamic resistance of the water are resolved into a resultant force which is directed at all times along a line which coincides with the line 24 and which passes through the axis of the hub 18. Therefore, the angular displacement of the lever 19 will at all times be equal to the angular displacement of the line 24.

It should be noted that the force component due to the mass of the weight 26 at all times tends to resist angular displacement of the lever 19 and the force component due to the hydrodynamic resistance of the water at all times tends to increase this angular displacement. It therefore follows that the device will be very sensitive while measuring low velocity flow rates or slow trolling speeds because the turning moment exerted upon the lever 19 by the force component due to the mass of the weight 26 approaches a zero value as the line 24 approaches a perpendicular position. At flow rates and trolling speeds only slightly greater than zero, the degree of the angular displacement for every unit of the force component due to the hydrodynamic resistance is at a maximum.

As the flow rate or trolling speed increases, the angular displacement of the line 24 will correspondingly increase thus causing an increase in the turning moment tending to restore the pointer 21 and lever 19 to the zero position as a result of the vertical force component due to the mass of weight 26. However, since the force component due to the hydrodynamic resistance of the water increases in proportion to the square of the relative velocity of motion, the increased turning moment due to the mass of weight 26 is compensated for and substantially offset throughout the normal range of operating speeds. Accordingly, the indicator is substantially as sensitive at the higher flow velocities and trolling speeds as it is in the lower speed range.

Because of the above operating characteristics it is possible to calibrate the indicator so that the markings 13 will represent definite relative speeds and will provide accurate speed data as the pointer moves across the scale. The individual gradations for the markings 13 may be substantially uniform across the scale since a given angular displacement of the lever 19 will represent a definite speed increment.

In assembling the indicator to the clamping mechanism, the bolt head 32 is inserted into the opening 28 until it reaches the central portion of the internal cavity in the indicator housing. The bolt head is then rotated one-eighth of a revolution with respect to the housing and then is allowed to snap into place in the countersunk opening 31 under the spring force exerted by the spring 40. The spring 40 is thereafter effective to hold the bolt head 32 securely against the shoulders within the opening 31.

The clamping members 30 and 35 may be readily assembled on the bolt 33 in the reverse position thereby making it possible to secure the device to an object of greater thickness due to the corresponding increase in the axial spacing of the associated clamping jaws 34 and 36. It is for this reason that the jaws 34 and 36 are provided with teeth on either side thereof. Clamping member 30 is provided with an end portion 29' on one side similar to the end portion 29 on the opposite side.

The clamping members 30 and 35 may be formed with identical dimensions and may be interchangeable with each other thus reducing the manufacturing cost of the device.

The clamping mechanism is preferably formed of a durable metal while the indicator housing and the pivoted lever therein are preferably made of a suitable plastic material. The device may be made in any convenient size, but preferably it should be sufficiently small so that it may be conveniently carried in the usual type of tackle boxes.

The indicator may be conveniently adapted to measure the flow velocity or trolling speed while moving in the opposite direction with respect to the water merely by securing the weighted line to the eyelet 23 instead of to the eyelet 22 as shown in the drawings.

The indicator may be clamped on either side of the fishing boat during trolling operations. The weighted line 24 may be secured to either of the eyelets 22 or 23 depending upon which one would be appropriate for the particular side of the boat to which the device is to be clamped.

It should also be noted that the readings obtained with the present speed indicator are not affected by variations in the depth of the weight 26 below the surface of the water. Therefore, when the device is clamped to the side of a boat which is rocking or pitching the device is still effective to provide accurate indications of the forward water speed. Of course, the weight 26 should not be above the surface of the water.

Since the various types of fishing lures require somewhat different trolling speeds, the speed of the fishing boat may be varied until the particular lure being used is acting satisfactorily. The indicator of the present invention will thereafter make it possible to maintain that adjusted speed by providing accurate indications of trolling speed which will not be adversely affected by the direction of the current, by wind or by surface disturbances.

While one specific embodiment of the present invention has been disclosed, it is understood that the invention is not limited thereto since many variations may readily become apparent to those skilled in the art and the invention is to be given its broadest possible interpretation within the scope of the following claims.

We claim:

1. A speed indicator for measuring the rate of flow of a moving body of water comprising: an inclosed circular housing, a lever pivoted within said housing at a point intermediate each end thereof, one end of said lever extending radially outward from said housing, the other end of said lever being adapted to move in an arcuate path inside said housing, an arcuate aperture formed in said housing adjacent said lever, an index member carried by said lever within said aperture, speed indicator markings on said housing adjacent said aperture for cooperating with said index member to provide speed data, a weighted flexible line secured to said one end of said lever and adapted to extend below the surface of the water, and clamping means for securing said housing to a fixed object comprising: a bolt having a head thereon secured within said housing, a first clamping member disposed about said bolt adjacent said housing and abutting the same, a second clamping member slidably disposed about said bolt, a wing nut threadedly engaged with said bolt and adapted to axially adjust said second clamping member, spring means disposed about said bolt intermediate said clamping members for biasing the same in opposite directions, and jaw members integrally formed on each of said clamping members.

2. A speed indicator for measuring the trolling speed of a fishing craft moving through a body of water comprising an inclosed circular housing, a lever pivoted within said housing at a point intermediate each end thereof, one end of said lever extending radially outward from said housing, the other end of said lever being adapted to move in an arcuate path inside said housing, an arcuate aperture formed in said housing adjacent said lever, an index member carried by said lever within said aperture, said one end of said lever having formed therein a pair of eyelets spaced equidistant from the centerline of said lever and on opposite sides thereof, a weighted flexible line secured to one of said eyelets and adapted to extend below the surface of the water, and clamping means for securing said housing to a solid object, said lever being adapted to undergo angular displacement in response to a corresponding angular displacement of said weighted line thereby providing speed data which is substantially directly proportional in magnitude to the trolling speed of the fishing craft.

3. A speed indicator as set forth in claim 1 wherein said one end of said lever has formed therein a pair of eyelets spaced on either side of the centerline of said lever and substantially equidistant therefrom and wherein said weighted line is secured to one of said eyelets thereby causing said lever to undergo an angular displacement which is directly proportional in magnitude to the trolling speed.

4. A speed indicator for measuring the trolling speed of a fishing craft through a body of water and adapted to be clamped by means of a clamping bolt to a portion of the craft comprising an enclosed circular housing, a lever pivoted within said housing at a point intermediate each end thereof, one end of said lever extending radially outward from said housing, the other end of said lever being adapted to move in an arcuate path inside said housing, an arcuate aperture formed in said housing adjacent said lever, an index member carried by said lever within said aperture, a weighted flexible line secured to said one end of said lever and adapted to extend below the surface of the water, means for clamping said housing to said craft comprising an aperture formed in said housing, and a countersunk recess formed within said housing about said aperture thereby forming a shoulder about said aperture within said housing, said aperture being shaped to receive therein a portion of said clamping bolt when said bolt assumes one angular position with respect to said housing, and said shoulder being adapted to retain and prevent the removal of said bolt when said bolt assumes another angular position with respect to said housing.

5. A speed indicator for measuring the trolling speed of a fishing craft through the water, comprising a housing, a lever pivotally mounted to said housing, a weighted flexible line secured to said lever adjacent one end thereof, another end of said lever being adapted to move in an arc in response to an angular displacement of said weighted line, and means for clamping said housing to said craft comprising an aperture formed in said housing, a shoulder formed about said aperture within said housing, a clamping bolt, said aperture being adapted to receive therein a portion of said clamping bolt when said bolt assumes one angular position with respect to said housing, and said shoulder being adapted to retain and prevent the removal of said bolt when said bolt assumes another angular position with respect to said housing.

References Cited in the file of this patent

UNITED STATES PATENTS

| | | |
|---|---|---|
| 1,312,011 | Wilkinson | Aug. 5, 1919 |
| 1,424,034 | Rigert | July 25, 1922 |
| 2,152,768 | Myers | Apr. 4, 1939 |
| 2,389,603 | Dollinger | Nov. 27, 1945 |